Dec. 1, 1970   R. E. HABERMAS ET AL   3,544,275
METHOD FOR DETERMINING THE PRESENCE OF ETHYLENE
GLYCOL IN LUBRICATING OIL
Filed June 26, 1967
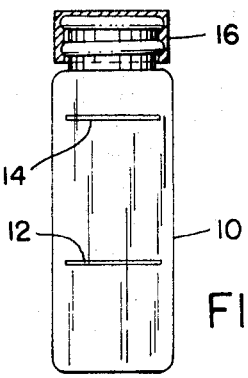
FIG.1
FIG.2
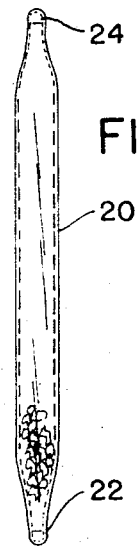
FIG.3
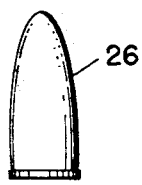
FIG.4
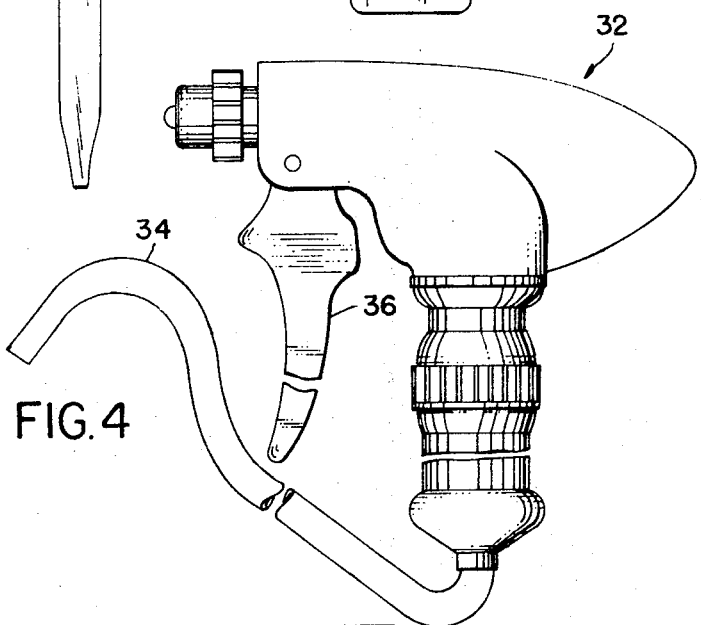
FIG.5
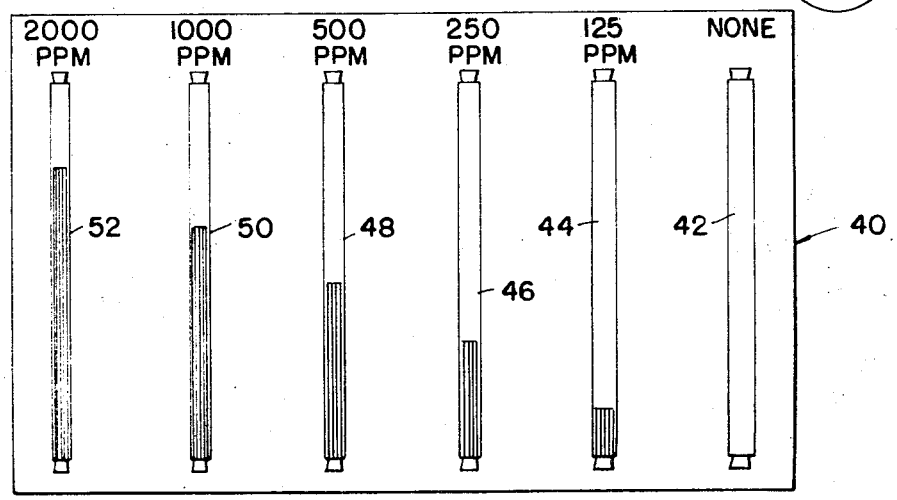
INVENTORS
ROBERT E. HABERMAS
THOMAS M. MORASKY
BY
ATTORNEYS United States Patent Office 3,544,275
Patented Dec. 1, 1970

3,544,275
METHOD FOR DETERMINING THE PRESENCE OF ETHYLENE GLYCOL IN LUBRICATING OIL
Robert E. Habermas, Livonia, and Thomas M. Morasky, Detroit, Mich., assignors to The Detroit Edison Company, Detroit, Mich., a corporation of New York
Filed June 26, 1967, Ser. No. 648,661
Int. Cl. G01n 31/08, 33/28
U.S. Cl. 23—230                                              8 Claims

ABSTRACT OF THE DISCLOSURE

Method for use by non-technical personnel in determining the presence and approximate amount of ethylene glycol in oil, such as lubricating oil for water-cooled internal combustion engines, characterized by the use of a chromograph comprising a transparent indicator tube having a granular chromatographic material therein treated with an indicator such as Schiff reagent, a simple graduated mixing vial for receiving a measured amount of a second reagent containing sodium metal periodate, and a sample of oil, in which the mixture of oil and second reagent is allowed to separate by gravity and the second reagent after separation is introduced into an open end of the indicator tube.

BACKGROUND OF THE INVENTION

In water-cooled internal combustion engines the use of ethylene glycol as an antifreeze has become wide spread. However, it has been found that even extremely small quantities of ethylene glycol passing from the engine cooling system into the crankcase where it mixes with the engine lubricating oil may lead to disastrous results. Ethylene glycol in any appreciable amount tends to polymerize the oil to a very viscous taffy-like material which plugs engine oil lines so that the bearings, and particularly the main bearings, are damaged because of lack of lubrication.

So far as is known, the presence of ethylene glycol in an oil up to the present time could only be positively determined by a laboratory test. The test as carried out in the laboratory involves the use of corrosive and somewhat hazardous chemical reagents. Consequently, the test could not be used in the field by non-technical personnel.

SUMMARY OF THE INVENTION

In accordance with the present invention there is provided a simple field test which involves simple equipment which can be used safely, rapidly and economically by nontechnical personnel and which gives a foolproof indication of the presence of ethylene glycol in the lubricating oil, and further gives a reasonably accurate quantitative result.

It is accordingly an object of the present invention to provide equipment permitting practice of a method of field testing by non-technical personnel which eliminates the hazards of contact with corrosive and hazardous chemical reagents.

It is a further object of the present invention to provide such a test comprising the use of simple equipment including an indicator tube containing a chromatographic material provided with an indicating reagent such as Schiff reagent, in which the indicator tube is preferably initially sealed at both ends and which in use has a second reagent separated from a mixture with the oil drawn into the indicator tube from one end.

Other objects and features of the invention will become apparent as the description proceeds, especially when taken in conjunction with the accompanying drawing, illustrating a preferred embodiment of the invention.

FIG. 1 is an elevational view, partly in section, of a mixing vial used in the present method.
FIG. 2 is an elevational view of a syringe used for charging the mixing vial.
FIG. 3 is an elevational view of an indicator tube.
FIG. 4 is an elevational view of an accumulator pump for withdrawing an oil sample.
FIG. 5 is an elevational view of a color chart used in the present invention.

DESCRIPTION OF THE PREFERRED EMBODIMENT

The presence of even relatively minute quantities of a glycol such as ethylene glycol used as an antifreeze in the water-cooled systems of internal combustion engines may ruin the engine before the presence of the glycol is determined. The glycol tends to polymerize the oil making it a viscous taffy-like material which quickly plugs engine oil lines and interferes with the delivery of lubricant to the bearings.

In order to permit inspection, and particularly of the engines of a fleet of motor vehicles to be given relatively periodic checks which are effective although inexpensive, there is provided inexpensive equipment capable of use by non-technical personnel, which is foolproof in its required procedure and which does not subject the personnel to the hazards of contact with corrosive or otherwise damaging chemicals.

Very briefly described, the test is performed by mixing a specimen of oil with a reagent containing sodium meta periodate to extract the ethylene glycol from the oil, permitting the oil and reagent to separate by gravity, and introducing the reagent containing the ethylene glycol, if any is present in the oil, into an indicator tube containing a chromatographic material provided with an indicator such for example as Schiff reagent. If ethylene glycol is present in the oil it enters the indicator tube and is separated by the chromatographic material and its presence indicated by a change in color in columns of variable length attributable to the Schiff reagent.

Referring now to the drawing, the equipment provided for carrying out the test comprises a mixing vial 10 having a first graduation 12 and a second graduation 14, the vial being provided with a conventional screw cap 16.

There is also provided an indicator tube 20 which is preferably heat sealed at both ends as indicated at 22, 24 and which contains a suitable chromatographic material. Inasmuch as the particular test results in a relatively weak color indication, it is very desirable for the chromatographic material to be white. Preferably, the material is provided in the form of granules resulting from separation by an American Society of Testing Materials procedure designated E-11-61, which results in the accumulation of granular material which will pass through a 30-mesh, 595 micron sieve but which will not pass through a 60-mesh, 250 micron sieve. Suitable chromatographic materials are silica gel, white fire brick, or the like. This material is treated with Schiff reagent which is apparently absorbed into the surface of the particles.

The Schiff reagent is prepared by dissolving 2.0 grams (basic) fuchsin in a mixture of 125 ml. sulfurous acid (ACS standard), 90 ml. C.P. methyl alcohol, and 110 ml. distilled water.

This chromatographic material is packed tightly into the indicator tube 20 and held in place by glass or polypropylene wool. Then the chromatographic material is coated with Schiffs reagent. Due to the fact that the ends of the tube are heat sealed the indicator tube has a shelf life exceeding one year. In use both ends of the tube 20 are file-nicked and broken off and the test material drawn into one end of the tube by suitable means. For example, a rubber pumping cap or bulb 26 may be provided, which is slipped over one end of the tube after the heat sealed end 24 is broken off.

A second reagent is provided for use in the vial 10 and this second reagent is prepared by mixing 0.8 gram of sodium meta periodate and 2.0 grams ammonium nitrate into 200 ml. of distilled water. The ammonium nitrate serves as a demulsifier in this reagent.

The equipment for carrying out the test includes a conventional springe 30 and an accumulating pump 32 having a long flexible tube 34 which may be introduced into the crankcase of the engine. The pump includes an operating lever 36 which is used to pump oil from the cranckcase and to discharge it into the mixing vial 10.

The equipment also comprises a comparison chart 40 which conceivably may be printed, showing the appearance of the indicator tube if glycol is present in the lubricating oil. Alternatively, the chart 40 may have stapled or otherwise fastened thereto a plurality of tubes 42, 44, 46, 48, 50 and 52. The tube 42 shows no discoloration except possibly a brown discoloration at one end and indicates no glycol in the lubricating oil. Tubes 44–52 show increasing larger amounts of glycol varying from 125 p.p.m. glycol in tube 44 to 2000 p.p.m. glycol in tube 52.

TEST PROCEDURE

The mixing vial 10 is filled to the first mark 12 with the second reagent including sodium meta periodate and thereafter is filled to the second mark 14, using the pump 32 with oil taken from the crankcase. The oil and reagent in the vial 10 are then mixed together for approximately 20 seconds, as for example by shaking the covered vial briskly. Thereafter, the mixing vial is left standing until the oil and reagent have separated by gravity, a condition which will be readily apparent since the reagent is clear and the oil is of course dark. Thereafter, the indicator tube 20 is prepared for use by breaking off the heat sealed ends 22 and 24 and applying the rubber pumping cap or bulb 26 if it is to be used. Thereafter, the open end of the indicator tube 20 is immersed into the clear liquid in the bottom end of the mixing vial and the clear liquid is drawn into the indicator tube by means of the rubber bulb 26 on the end of the tube.

If glycol is present in the oil the contents of the indicator tube 20 will change to a purple color, the intensity and length of the column of the color being an indication of the amount of glycol present. In order to provide a quick and ready procedure for reading the results the indicator 20 is compared to the color chart 40 and the tube or illustration of the tube most nearly corresponding to the appearance of the tube 20 is selected.

With the present apparatus it will be apparent that the operator need have no knowledge of the chemical reactions involved and need follow only the simple directions, which requires him to place the second reagent and oil into the mixing vial to the levels marked thereon, to shake the vial, and thereafter permit separation by gravity. The test is completed by drawing the clear reagent from the bottom of the mixing vial 10 into one end of the indicator tube 20.

What we claim as our invention is:

1. The method of making a test for the presence of ethylene glycol in lubricating oil by non-technical personnel which comprises providing in a mixing chamber a known quantity of a reagent including a glycol extractant, adding oil from an engine crankcase to the chamber to bring the level of the mixture therein to a graduation to provide known proportions of the reagent and oil, mixing the reagent and oil and allowing gravity separation, adding separated reagent with the extracted glycol to a transparent chamber containing chromatographic material provided with a visible indicator, and determining the presence and approximate quantity of ethylene glycol by a comparison of the color in the indicator with a series of calibrated variously colored specimens.

2. The method as defined in claim 1 in which the glycol extractant in the reagent is sodium meta periodate.

3. The method as defined in calim 1 in which the visible indicator is Schiff reagent.

4. The method as defined in claim 1 in which the glycol extractant in the reagent is sodium meta periodate and the visible indicator is Schiff reagent.

5. The method of making a test for the presence of ethylene glycol in lubricating oil by non-technical personnel which comprises filling a mixing vial to a first graduation with a reagent including sodium meta periodate and adding oil from an engine crankcase to a second graduation, mixing the oil and reagent by shaking the vial for a few seconds and permitting separation by gravity, thereafter drawing the reagent from the mixing vial into a test tube having chromatographic material therein provided with a visible indicator, and determining the presence and approximate quantity of ethylene glycol by comparing the color observable in the tube with indicia exhibiting a series of simulated tubes with colors indicating differing amounts of glycol.

6. The method of claim 5 in which the chromatographic material is granules of silica gel or white fire brick.

7. The method of claim 6 in which the granules have a grain size of 30–60 mesh, U.S. standard.

8. The method of claim 6 in which the indicator on the chromatographic material is Schiff reagent.

References Cited

UNITED STATES PATENTS 2,487,077   11/1949   Shepherd _____ 23—254 XR

OTHER REFERENCES

Jordan: Materials Research & Standards, vol. 1, January 1961, p. 30.

Heftman: Chromatography, 2nd ed., May 5, 1967, pp. 49, 51, 89, 93, 498–9.

Rosin: Reagent Chemicals & Standards, 4th ed., 1961, pp. 415–6.

Snell and Snell: Colorimetric Methods of Analysis, 3rd ed., vol. III, 1953, pp. 268–9.

Shriner and Fuson: Sys. Identification of Org. Cmpds., 3rd ed., 1948, pp. 101–2, 115.

"Service Bulletin," LaMofte Co., 1955.

Randerath: "Thin-Layer Chromatography," 1963, pp. 71, 72.

Laboratory Practice, April 1964, pp. 303–304.

JOSEPH SCOVRONEK, Primary Examiner

D. G. MILLMAN, Assistant Examiner

U.S. Cl. X.R.

23—253